(12) United States Patent
Morello et al.

(10) Patent No.: US 11,550,050 B2
(45) Date of Patent: Jan. 10, 2023

(54) RADAR VISUALIZATION OF CLOUD NATIVE ENVIRONMENTS

(71) Applicant: Twistlock, Ltd., Herzliya (IL)

(72) Inventors: John Morello, Baton Rouge (IL); Dima Stopel, Herzliya (IL); Liron Levin, Herzliya (IL); Nerya Agam, Tel-Aviv (IL); Reut Kravchook, Tel-Aviv (IL)

(73) Assignee: Twistlock Ltd., Herzliya (IL)

( * ) Notice: Subject to any disclaimer, the term of this patent is extended or adjusted under 35 U.S.C. 154(b) by 935 days.

(21) Appl. No.: 16/287,488

(22) Filed: Feb. 27, 2019

(65) Prior Publication Data

US 2020/0271774 A1  Aug. 27, 2020

(51) Int. Cl.

| G06F 15/173 | (2006.01) |
| G01S 13/89 | (2006.01) |
| H04L 41/12 | (2022.01) |
| H04L 43/0811 | (2022.01) |
| G06F 9/30 | (2018.01) |
| H04L 41/14 | (2022.01) |

(52) U.S. Cl.
CPC ............ *G01S 13/89* (2013.01); *G06F 9/3004* (2013.01); *H04L 41/12* (2013.01); *H04L 41/14* (2013.01); *H04L 43/0811* (2013.01)

(58) Field of Classification Search
CPC ....... H04L 41/12; H04L 41/14; H04L 43/0811
See application file for complete search history.

(56) References Cited

U.S. PATENT DOCUMENTS

| 2013/0070622 | A1* | 3/2013 | Degioanni | .............. H04L 43/12 370/252 |
| 2015/0052441 | A1* | 2/2015 | Degioanni | ............ H04L 41/145 715/734 |
| 2016/0119213 | A1* | 4/2016 | El Defrawy | ............ H04L 67/10 709/224 |
| 2018/0287876 | A1* | 10/2018 | Strobel | ................ H04L 67/1004 |
| 2020/0364128 | A1* | 11/2020 | Vittal | ................... G06F 11/3055 |

* cited by examiner

*Primary Examiner* — Padma Mundur
(74) *Attorney, Agent, or Firm* — Gilliam IP PLLC

(57) ABSTRACT

A plurality of connection patterns is determined based on connectivity data collected by a plurality of agents. Each agent of the plurality of agents is installed on a respective compute node of a plurality of compute nodes. The connectivity data collected by each agent of the plurality of agents includes node-local connectivity data indicating node-local connections for the respective compute node on which the agent is installed. The node-local connections include communications with at least one application entity hosted by the respective compute node. A graph representation that is organized with respect to the at least one application entity hosted by each of the plurality of compute nodes is generated based on the plurality of connection patterns.

20 Claims, 10 Drawing Sheets

RADAR VISUALIZATION OF CLOUD NATIVE ENVIRONMENTS

TECHNICAL FIELD

The present disclosure relates generally to securing cloud native environments, and more specifically to radar visualization of cloud native environments.

BACKGROUND

Cloud native technology provides techniques for building and running applications using the benefits of the cloud computing delivery model. With the increasing use of cloud computing, more organizations have adopted cloud native applications that are designed to take advantage of cloud computing frameworks. Specifically, cloud native applications are designed to break down tasks into separate services that can be run on different servers which may be in different geographical locations. Cloud native applications allow for rapidly scaling as demand changes by utilizing modular services in place of some locally hosted functions.

Cloud native environments utilize technologies such as containers, microservices, and declarative application program interfaces (APIs) to provide scalable functionality. The containers provide all information needed to run an application in a self-contained bundle. Each microservice provides a single function for the application. A microservice is independent of the applications such that, for example, it can be used by different applications and its underlying software can be updated separately from any applications.

Common multi-cloud environments are composed of a large number of assets providing compute and/or storage services. These assets may be of different types such as, for example, serverless applications, Kubernetes clusters, software containers, virtual machines, registries, serverless functions, and the like.

A challenge in securing such environments is adapting to changes within the environments. Unlike traditional infrastructure in which resources are typically allocated by human operators and assigned long-lived, persistent identifiers such as IP addresses and DNS names, cloud native environment infrastructures are ever-changing as automated systems allocate resources.

As resources are allocated, a cloud administrator must manually manage the posture of assets in the cloud native environment and ensure that all assets are deployed are protected. To this end, an operator may create a diagram to document and understand the data flows across servers. However, this task becomes infeasible as the number of different services interacting among servers increases. In particular, for cloud native environments, applications may run using dozens of microservices spread across different servers. Further, it is impractical to manually observe data flows across multiple servers to identify new microservices and connections.

Moreover, as noted above, cloud native environment infrastructures are subject to frequent changes over time that also result in using temporary or otherwise non-persistent identifiers. Human operators can no longer reasonably create rules that rely on an application maintaining the same IP address throughout its life or use monitoring tools expecting only occasional changes.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for radar visualization of a cloud native environment. The method comprises: determining a plurality of connection patterns based on connectivity data collected by a plurality of agents, wherein each agent of the plurality of agents is installed on a respective compute node of a plurality of compute nodes, wherein the connectivity data collected by each agent of the plurality of agents includes node-local connectivity data indicating node-local connections for the respective compute node on which the agent is installed, wherein the node-local connections include communications with at least one application entity hosted by the respective compute node; and generating, based on the plurality of connection patterns, a topological graph, wherein the topological graph is organized with respect to the at least one application entity hosted by each of the plurality of compute nodes.

Certain embodiments disclosed herein also include a non-transitory computer readable medium having stored thereon causing a processing circuitry to execute a process, the process comprising: determining a plurality of connection patterns based on connectivity data collected by a plurality of agents, wherein each agent of the plurality of agents is installed on a respective compute node of a plurality of compute nodes, wherein the connectivity data collected by each agent of the plurality of agents includes node-local connectivity data indicating node-local connections for the respective compute node on which the agent is installed, wherein the node-local connections include communications with at least one application entity hosted by the respective compute node; and generating, based on the plurality of connection patterns, a topological graph, wherein the topological graph is organized with respect to the at least one application entity hosted by each of the plurality of compute nodes.

Certain embodiments disclosed herein also include a system for radar visualization of a cloud native environment. The system comprises: a processing circuitry; and a memory, the memory containing instructions that, when executed by the processing circuitry, configure the system to: determine a plurality of connection patterns based on connectivity data collected by a plurality of agents, wherein each agent of the plurality of agents is installed on a respective compute node of a plurality of compute nodes, wherein the connectivity data collected by each agent of the plurality of agents includes node-local connectivity data indicating node-local connections for the respective compute node on which the agent is installed, wherein the node-local connections include communications with at least one application entity hosted by the respective compute node; and generate, based on the plurality of connection patterns, a topological graph, wherein the topological graph is organized with respect to the at least one application entity hosted by each of the plurality of compute nodes.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
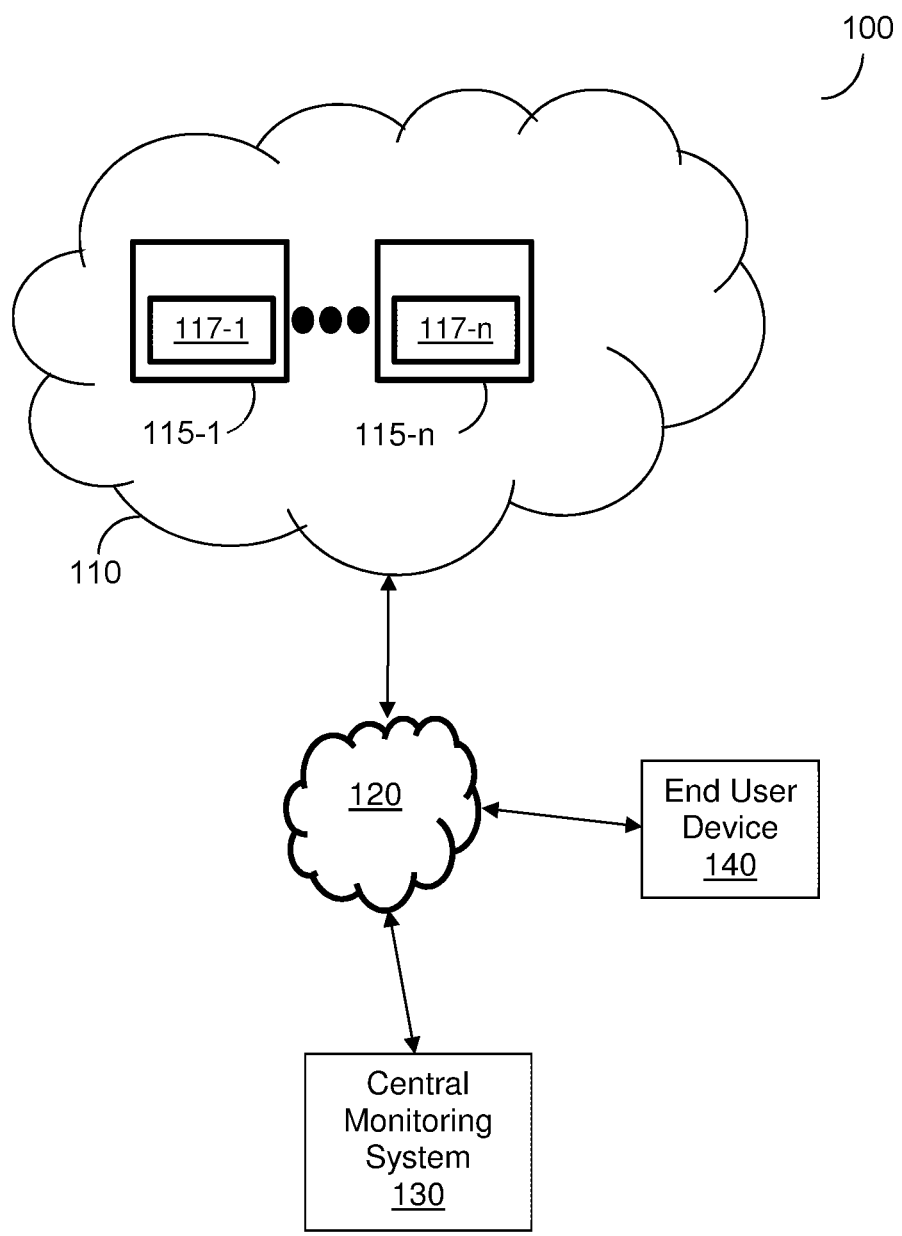
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for radar visualization of cloud native environments. A security agent is installed on a compute node used for executing applications in one or more cloud native environments. Each security agent is configured to monitor traffic into and out of its respective compute node in order to learn connectivity patterns for microservices executed on the compute node. Each security agent is configured to generate node-local connectivity data based on the connectivity patterns.

In an embodiment, a central monitoring system receives connectivity data from the compute nodes. The connectivity data includes, but is not limited to, node-local connectivity data indicating node-local connections from the perspective of each of the compute nodes. The central monitoring system is configured to aggregate and normalize the connectivity data across the compute nodes. The central monitoring system organizes the connectivity data with respect to application entities. The central monitoring system has knowledge of unique persistent entity identifiers of application entities hosted by the compute nodes and is configured to model traffic flows based on the local connectivity data and the persistent entity identifiers. In an example implementation, each entity is a microservice. The modeling results in a topological graph showing connections among application entities in the cloud native environment with respect to normal traffic patterns. As application entities are updated or redeployed, new connections may be learned and old connections may be removed based on new traffic patterns.

In some implementations, the central monitoring system may be further configured to enrich the topological graph using enrichment data related to external security knowledge. As an example, a vulnerability state of application components used for executing each application entity may be included in enrichment data. The central monitoring system may be further configured to visually depict the enrichment data. In the aforementioned example, when a vulnerability state of an application entity is high risk, the application entity may be depicted in a manner that is visually distinct from application entities that are not high risk. Such risk may be re-assessed dynamically as new node-local connectivity data is received and visual representations thereof may be updated as the topological graph changes.

In some implementations, the connection patterns may be further manipulated to remove infrastructure, redundant, or otherwise unnecessary entities. This, in turn, simplifies the resulting topological graph presented to a user. To this end, some disclosed embodiments may include aggregating related applications based on common entities, modifying a network topology layout based on application patterns or application types, and the like.

The disclosed embodiments address issues with manual tracking of cloud native environment infrastructures by utilizing underlying platforms of such infrastructures to discover connectivity and security states automatically. The resulting topology graph may be updated automatically as new connections are learned dynamically across all application components over time. Various disclosed embodiments further provide side-band techniques for monitoring traffic that reduce the impact on application performance without sacrificing completeness of the data.

As an example, a single application may be composed of 10 microservices running across 5 compute nodes. Each microservice may communicate with several others and may be updated independently of the others. According to existing solutions, manually documenting the overall connectivity of these components at even a single point in time becomes impractical as the number of interconnected application entities grows. Further, the human operator would need to manually remap the entire infrastructure each time identifiers or connections change. According to various disclosed embodiments, however, a security agent is executed on each of the compute nodes and is configured to learn connectivity patterns for each microservice hosted on its respective compute node. Thus, each compute node has a local view of all traffic into and out of its microservices.

Additionally, the disclosed embodiments organize at least a portion of the connectivity data with respect to application entities (i.e., entities used for providing portions of applications such as microservices) as opposed to host entities (i.e., discrete components of the host compute node). To this end, various disclosed embodiments organize networking data with respect to application identifiers such as pod identifier and image identifier, rather than with respect to network-specific identifiers such as host names and IP addresses. This application entity-specific organization allows for monitoring connections more effectively than existing solutions that track entities based on network-specific identifiers that may change over time.

More specifically, the disclosed embodiments do not require learning or monitoring inter or intra compute node traffic flows directly. Instead, the disclosed embodiments utilize inter node traffic patterns from the perspective of each compute node and correlate these inter node traffic patterns to learn connections with respect to cloud native structures such as microservices or other application-specific entities rather than network addresses or other ephemeral identifiers. As an example, the disclosed embodiments may learn that a microservice A sends traffic to a microservice B but not to microservices C or D based on traffic flows from the respective compute nodes hosting microservices A, B, C, and D.

FIG. 1 shows an example network diagram 100 utilized to describe the various disclosed embodiments. In the example network diagram 100, components of a cloud native environment 110 communicate with a central monitoring system 130 via a network 120. The network 120 may be, but is not limited to, a wireless, cellular or wired network, a local area network (LAN), a wide area network (WAN), a metro area network (MAN), the Internet, the worldwide web (WWW), similar networks, and any combination thereof.

The cloud computing environment 110 includes a plurality of compute nodes 115-1 through 115-$n$ (referred to individually as a compute node 115 and collectively as compute nodes 115). Each compute node 115 is configured to provide at least a portion of one or more cloud computing services. To this end, each compute node 115 is configured with one or more application entities (not shown) for providing portions of services. As a non-limiting example, such an application entity may provide a microservice used by one or more cloud computing applications.

The compute nodes 115 collectively provide features of cloud computing applications. As a non-limiting example, an application may be composed of 10 microservices running across 5 compute nodes 115-1 through 115-5.

Each compute node 115 further includes a respective security agent 117. Each security agent 117 is a software agent configured to monitor traffic into and out of its host compute node 115 and to learn connectivity patterns for the compute node 115 based on the monitored traffic. Specifically, the connectivity patterns include connections between application entities hosted in the compute node 115.

In an embodiment, each security agent 117 is configured for side-band monitoring that does not require deployment in-line of traffic flows. To this end, each security agent 117 is configured to access monitoring functions of its host compute node 115 to identify all connections between the host compute node 115 and external sources. Since the security agents 117 do not need to be deployed in-line of traffic, connections do not need to pass through the security agents 117 or the central monitoring system 130. In turn, this increases the scalability and performance of monitoring traffic as compared to solutions requiring processing each packet sent between endpoints. It should be noted that, in some implementations, the security agents 117 may intercept traffic in order to, for example, verify monitoring data accessed through the host compute node 115, obtain additional traffic data, and the like.

In a further embodiment, to implement the side-band monitoring, each security agent 117 is configured to check a type of its host compute node 115 when initialized. Each security agent 117 is configured to dynamically reconfigure itself, the host compute node 115, or both, as needed, to obtain access to required monitoring functions and information. As a non-limiting example, a security agent 117 may elevate its own privileges on the host compute node 115 to allow for reading required monitoring data.

The security agents 117 are configured to generate node-local connectivity data for their respective host compute nodes 115 and to send the node-local connectivity data to the central monitoring system 130. The central monitoring system 130 is configured to receive the node-local connectivity data from the security agents 117 and to generate, based on the node-local connectivity data, a topological graph of the connections among application entities hosted by the compute nodes 115.

The central monitoring system 130 may further be configured to obtain connectivity data related to the infrastructure in which the compute nodes 115 are deployed. As non-limiting examples, the central monitoring system 130 may be configured to retrieve cloud provider metadata related to an entity that owns or operates the computing environment 110, infrastructure logs for the computing environment 110, infrastructure configuration data (e.g., network policy data) for the computing environment 110, or a combination thereof. At least some of the infrastructure-related connectivity data may also be node-local connectivity data that may be used for determining connection patterns in accordance with the disclosed embodiments. As non-limiting examples, network traffic data from the compute nodes 115 or logs from a local metadata service (not shown) may be used as additional node-local connectivity data.

The infrastructure-related connectivity data may be retrieved from, for example, a service manager (not shown) deployed in the cloud computing environment 110, one or more of the computing nodes 115, one or more data sources (not shown) of the computing environment 110, and the like.

It should be noted that a single cloud computing environment 110 is shown in FIG. 1 merely for simplicity purposes, and that multiple cloud computing environments may be visualized in accordance with the disclosed embodiments. Further, the multiple cloud computing environments may be visualized separately (i.e., such that each has a distinct topological graph showing interactions among application entities within a single cloud computing environment) or in combination (i.e., such that they share a topological graph illustrating interactions among application entities across cloud computing environments).

Figure 2A:
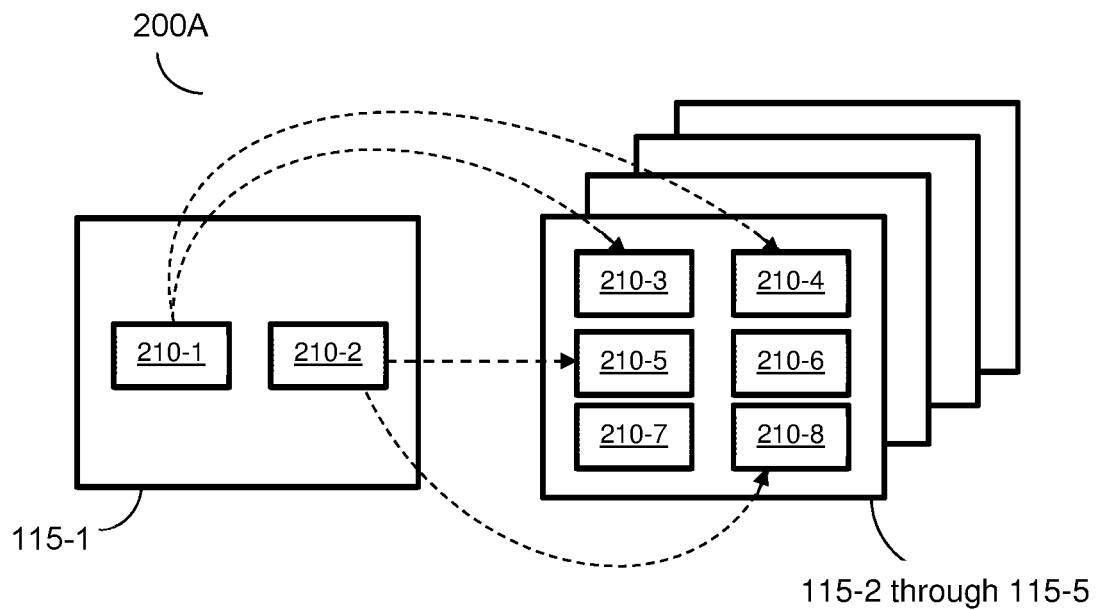
FIGS. 2A-C are example diagrams illustrating organization of node-local connectivity data into a topological graph of application entities across compute nodes.
Figure 2B:
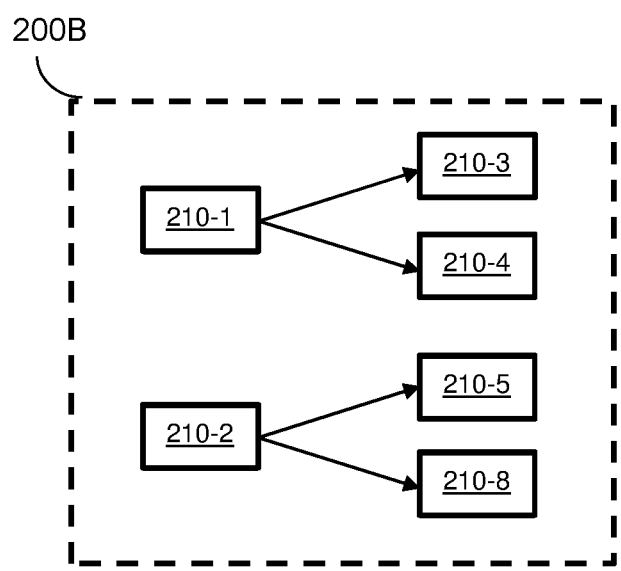
Figure 2C:
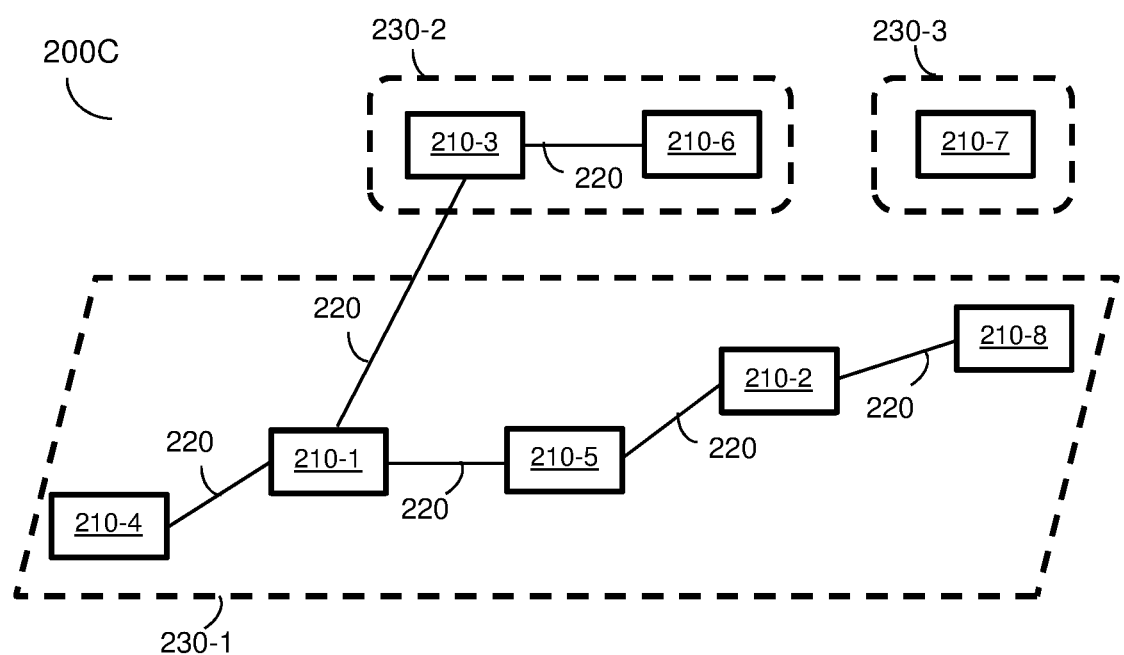

FIGS. 2A-C are example illustrations 200A, 200B, and 200C, respectively, demonstrating organization of node-local connectivity data into a topological graph of application entities across compute nodes.

In the illustration 200A, a first compute node 115-1 hosts two microservices 210-1 and 210-2. The microservices 210-1 and 210-2 are application entities used to provide functions of an application. The microservices 210-1 and 210-2 communicate with at least some of the microservices 210-3 through 210-8 hosted in compute nodes 115-2 through 115-5. It should be noted that the diagram has been simplified to illustrate all microservices hosted in the compute nodes 115-2 through 115-5 together merely for simplicity purposes, i.e., to distinguish between microservices hosted in the compute node 115-1 and microservices hosted in the other compute nodes 115-2 through 115-5.

In the illustration 200A, it is shown that microservice 210-1 sends data to microservices 210-3 and 210-4. Similarly, microservice 210-2 sends data to microservices 210-5 and 210-8. Thus, node-local connections relevant for compute node 115-1 include the connections between microservice 210-1 and each of microservices 210-3 and 210-4 as well as the connections between microservice 210-2 and each of the microservices 210-5 and 210-8.

The illustration 200B demonstrates organization of connectivity data for node-local connections for the compute node 115-1. Notably, the connectivity data is arranged with respect to microservices 210 (i.e., application entities), which may be identified using persistent application entity identifiers. Further, the node-local connectivity data that is visually represented in illustration 200B demonstrates node-local connections from the perspective of the compute node 115-1, i.e., connections with the microservices 210-1 and 210-2 hosted on the compute node 115-1.

The illustration 200C demonstrates an example topological graph of the microservices 210. The topological graph illustrates the microservices 210-1 through 210-8 which communicate among the compute nodes 115-1 through 115-5. Further, bidirectional communications among the microservices 210 are illustrated by connectors 220. The topological graph is created based on correlations of node-local connectivity data (i.e., the node-local connectivity data visually represented by FIG. 2B may be correlated with node-local connectivity data for each other compute node 115-2 through 115-5). In the example illustration 200C, the microservices 210-1 through 210-8 are organized into groupings 230-1 through 230-3. Each grouping 230 may represent, for example, an application using one or more of the microservices 210-1 through 210-8.

The visualizations of node-local and cross-node connections are created and organized with respect to application entities such as microservices rather than network entities. Thus, the visualization may be readily updated even as network configurations change (e.g., when new IP addresses are assigned to the compute nodes 115-1 through 115-5) without requiring new designations of the entities.

Figure 3:
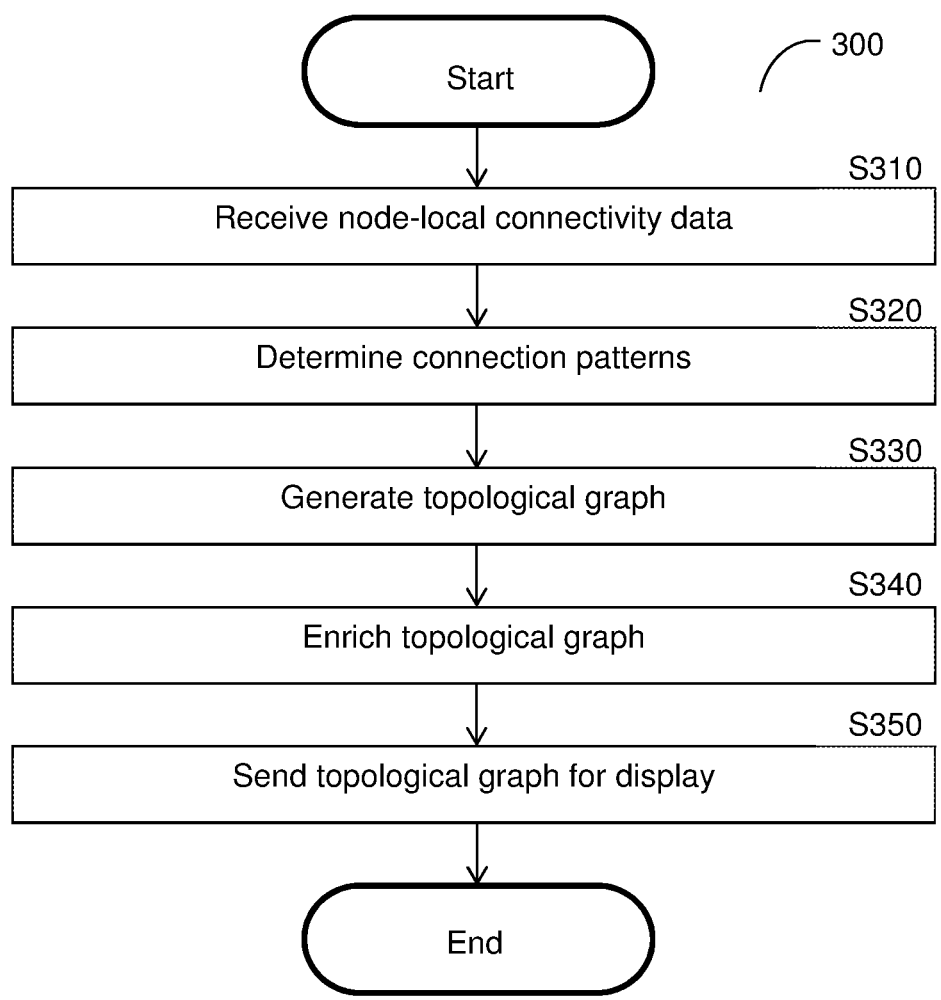
FIG. 3 is a flowchart illustrating a method for radar visualization of a cloud native environment according to an embodiment.

FIG. 3 is an example flowchart 300 illustrating a method for visualization of a cloud computing environment according to an embodiment. In an embodiment, the method is performed by the central management system 130, FIG. 1.

At S310, node-local connectivity data is received from each of multiple compute nodes (e.g., each of the compute nodes 115, FIG. 1). The node-local connectivity data indicates connections, groupings, or both, of each application entity hosted by each compute node as well as an application entity identifier of each respective application entity. The groupings may include groupings of entities used by the same application. To this end, the node-local connectivity data may include, but is not limited to, connectivity patterns, infrastructure metadata, use of common middleware among application entities, common or known patterns of traffic flows between tiers of application entities, predetermined communication patterns (e.g., Kubernetes infrastructure entities may have predefined communication patterns). In some implementations, the connectivity data may exclude connections between application entities and infrastructure components. As non-limiting examples, all entities may communicate with a Domain Name Server such that these communications should be excluded, logging tools may communicate with all entities separate from providing services and should be excluded, and the like.

In an embodiment, the node-local connectivity data is received from a security agent installed on each compute node. The security agent may be configured to reconfigure itself, its host compute node, or both, such that required monitoring functions are available to the security agent. In a further embodiment, each security agent may be configured for side-band monitoring in which the agent is deployed out-of-line of traffic into and out of the host compute node. Deploying security agents for node-local connection monitoring is described further herein below with respect to FIG. 4.

In an embodiment, S310 may further include retrieving infrastructure-related connectivity data such as, but not limited to, cloud provider metadata related to an entity that owns or operates the computing environment in which the compute nodes are deployed, infrastructure logs for the computing environment, infrastructure configuration data for the computing environment, or a combination thereof.

At S320, connection patterns are determined based on the received connectivity data for each compute node. In an embodiment, S320 includes correlating the node-local connectivity data among compute nodes such that connectivity patterns are established when node-local connectivity data among different compute nodes indicates connections among the same application entities. In another embodiment, S320 may further include grouping at least some application entities.

In an embodiment, S320 may further include aggregating related applications based on common application entities. When related applications are aggregated, such aggregation may result in a multiple tier topological graph. In an embodiment, the multiple tier topological graph includes a higher tier in which relationships among applications and between applications and application entities are shown. In such an embodiment, the multiple tier topological graph also includes a lower tier in which relationships among application entities are shown. The higher tier may be initially shown to a user and relevant portions of the lower tier are shown based on user interactions (e.g., a drill-down of application entity relationships for one of the applications may be shown in response to a user interacting with that application). This, in turn, results in a less cluttered presentation to the user that allows for providing more efficient user navigation with respect to the topological graph.

Non-limiting examples for aggregating related applications follow. First, for a serverless compute service (e.g., AWS Lambda), each application may be composed of multiple functions provided by application entities. Second, for a cloud native application, applications may be aggregated based on graph connectivity (i.e., the higher tier of the topological graph may illustrate the tiers of a multitier application). An application may be a multitier application when, for example, the last tier of the application is a database. For example, api-gateway+proxy+redis+database may be a 3-tier application. An example higher tier of a topological graph illustrating a multitier application is described further herein below with respect to FIG. 6G. Third, for a container management platform, all namespaces may be detected and only namespaces may be shown in the higher tier.

At S330, based on the determined connection patterns, a topological graph is generated. The topological graph is organized with respect to application entities hosted by the compute nodes and visually represents connections among the application entities.

In an embodiment, S330 includes modifying a network topology layout based on application patterns or application types, where each node of the network topology layout corresponds to a position on the resulting topological graph. Modifying the network topology may include, but is not limited to, removing entities that are infrastructure entities rather than application entities, modifying the arrangement of nodes on the topological graph, or both. To remove infrastructure entities, S330 includes detecting entities that are known as infrastructure entities based on the connectivity data. As a non-limiting example, an entity may be determined as a sidecar which is considered infrastructure and, therefore, removed from the topological graph.

Figure 6A:
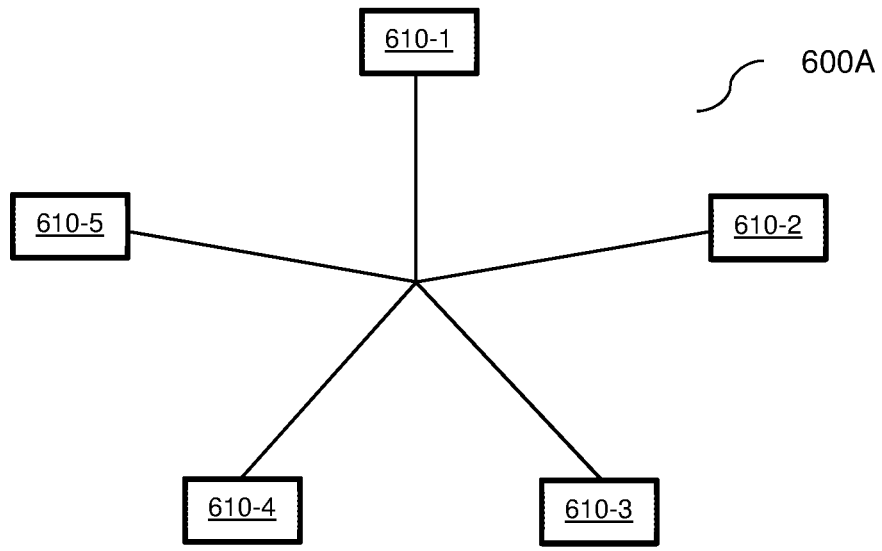
FIGS. 6A-G are example diagrams illustrating various arrangements of nodes of a topological graph.
Figure 6B:
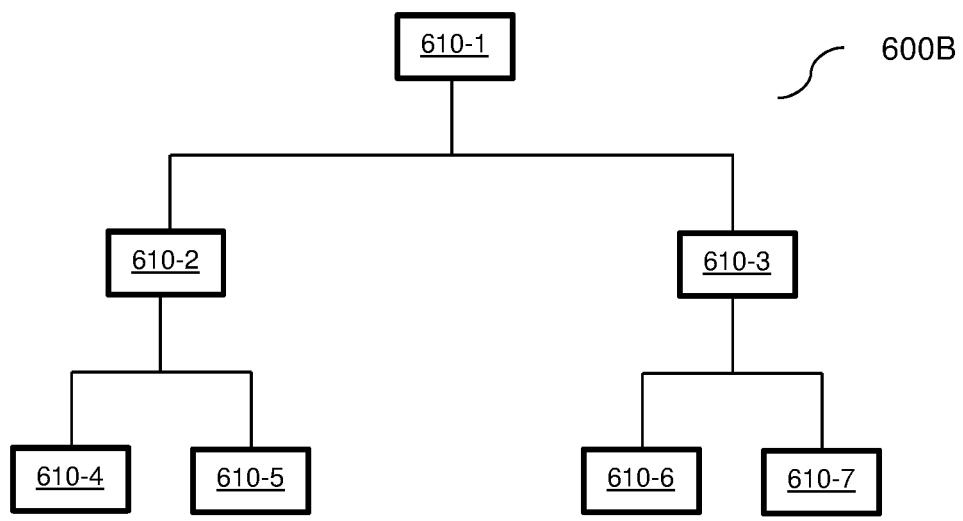
Figure 6C:
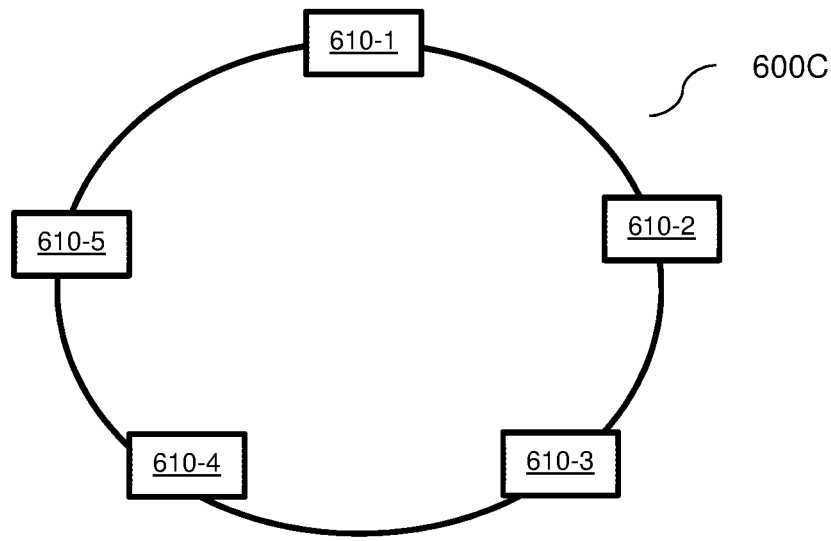
Figure 6D:
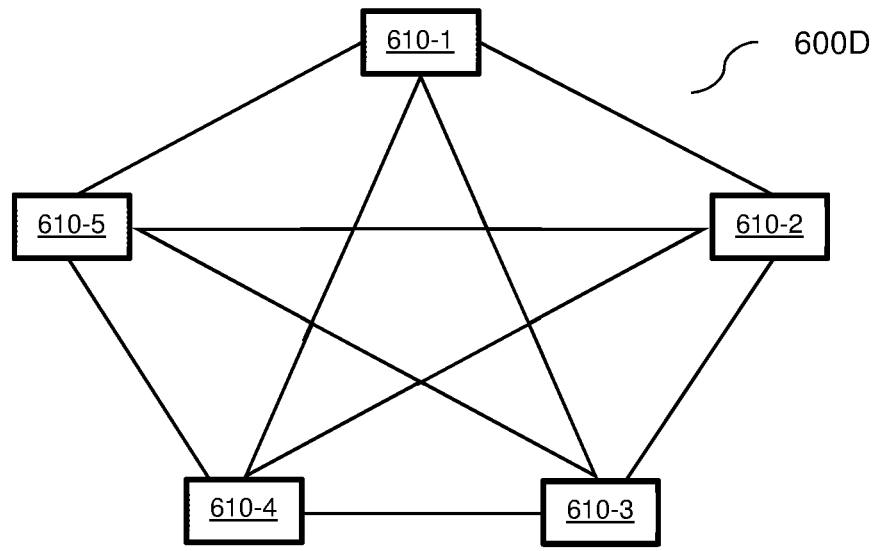
Figure 6E:
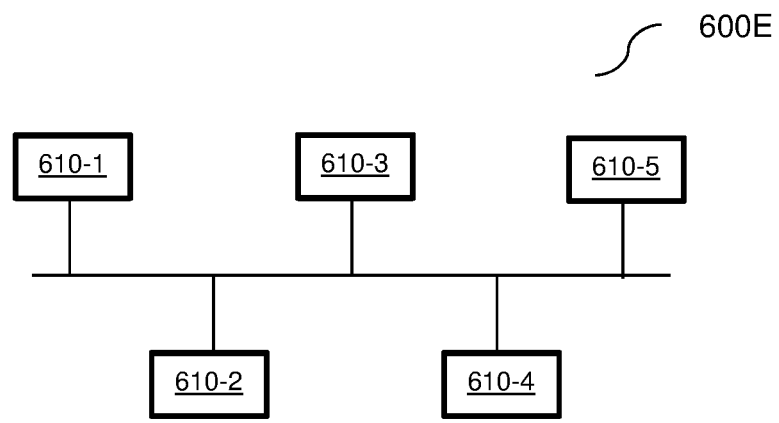
Figure 6F:
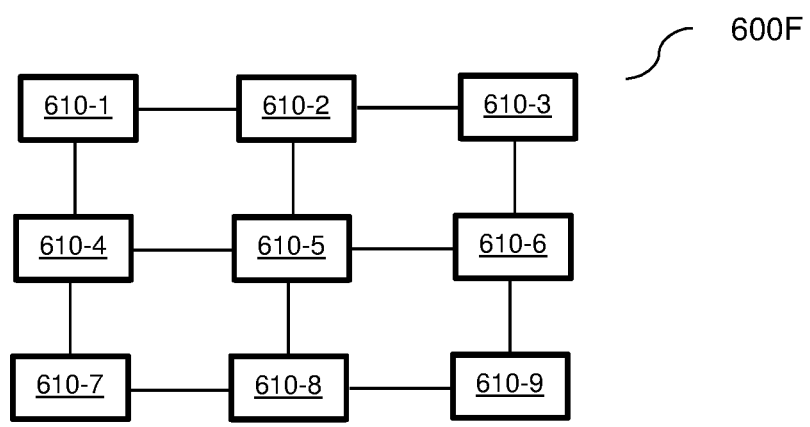
Figure 6G:
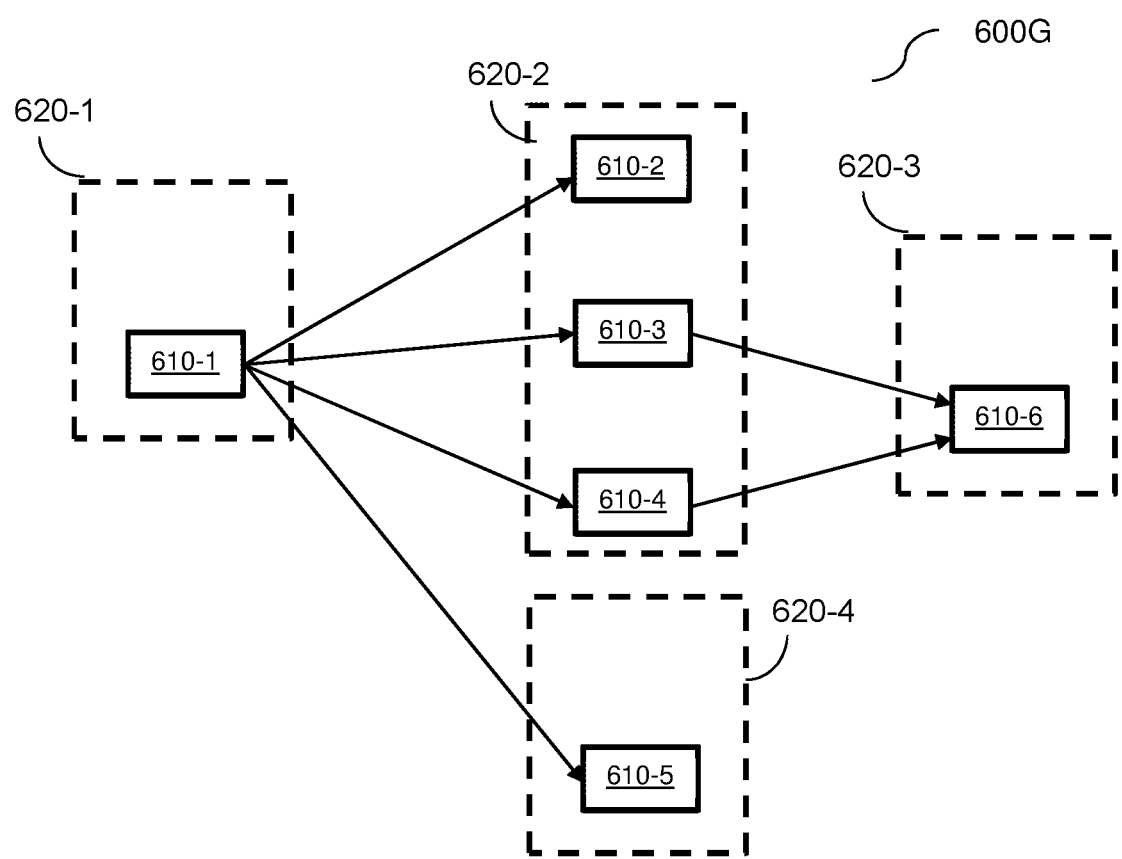

As non-limiting examples of arrangements, connections among nodes of the topological graph may be in the form of 1-N (e.g., for a load balancer to gateway service connection), N-N (e.g., for a service mesh), 1-1 (e.g., for a gateway to database connection), or N-1 (e.g., for a microservices to message queue connection), and may be further organized into different layouts. FIGS. 6A-6G show various arrangements 600A through 600G, each arrangement including various nodes 610-1 through 610-N. More specifically, FIGS. 6A-6F show a star arrangement 600A, a tree arrangement 600B, a ring arrangement 600C, a fully connected arrangement 600D, a bus arrangement 600E, and a mesh arrangement 600F. FIG. 6G shows an example left-to-right view of a higher tier 600G of a topological graph. The higher tier 600G illustrates the nodes 610 as applications grouped by tiers 620.

At optional S340, the topological graph may be enriched using additional security data. Such security data may include, as a non-limiting example, vulnerability states of application functions provided by each application entity. The enrichment may result in high-risk application entities or other potential security issues as being visually distinct from low-risk application entities.

At S350, the topological graph is sent for display (e.g., to the end user device 140, FIG. 1) and execution may continue with S310, in which additional node-local connectivity data is received and used to update the topological graph. Accordingly, the topological graph may be dynamically updated as connectivity patterns among application entities change.

It should be noted that FIG. 3 is described as a method for radar visualization of a cloud computing environment, but that multiple cloud computing environments (e.g., cloud computing environments hosted in different cloud computing platforms) may be visualized in accordance with the disclosed embodiments. Specifically, the disclosed embodiments include monitoring connections among application entities regardless of whether those application entities are hosted in the same cloud computing environment or different cloud computing environments.

Figure 4:
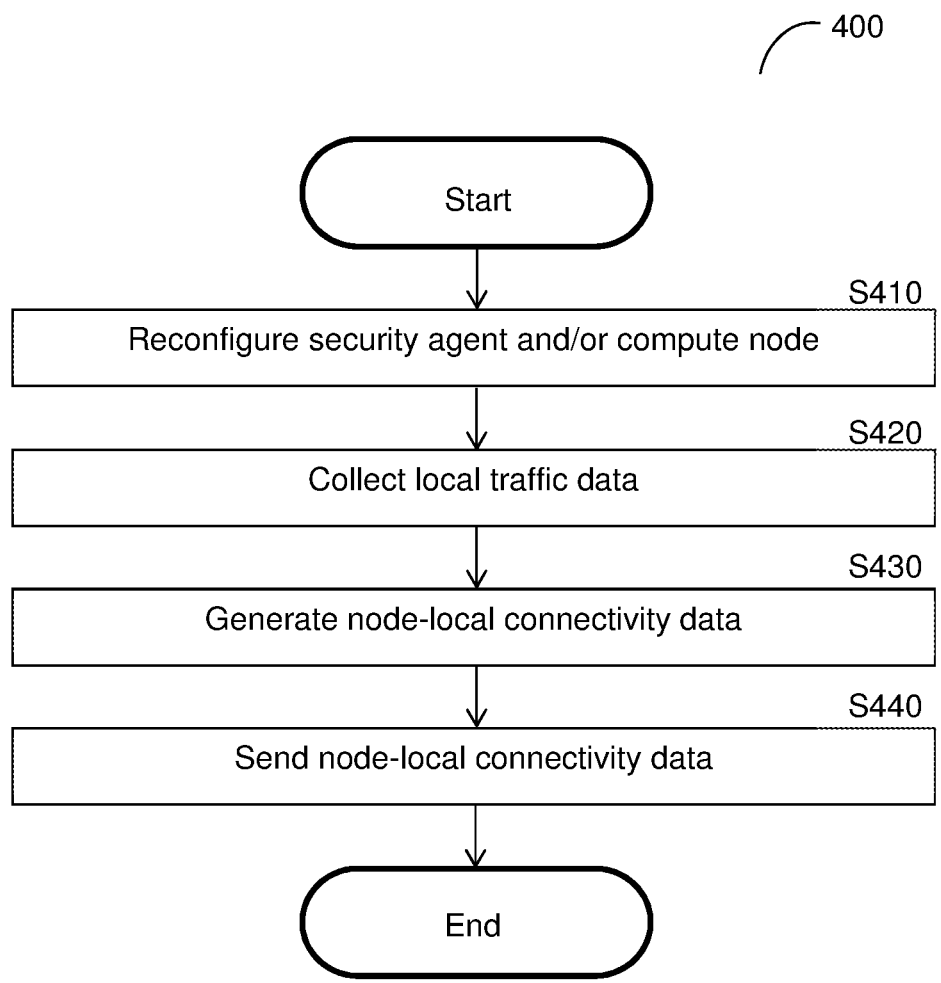
FIG. 4 is a flowchart illustrating a method for deploying a security agent for providing node-local connectivity data according to an embodiment.

FIG. 4 is an example flowchart 400 illustrating a method for deploying a security agent to provide node-local connectivity data according to an embodiment. In an embodiment, the method is performed by one of the security agents 117, FIG. 1.

At S410, when the security agent is initialized, the security agent reconfigures itself, the compute node, or both, such that the security agent is allowed access to any required monitoring functions of the compute node. To this end, S410 may include the security agent checking the type of endpoint it is installed on. The reconfiguration may include, but is not limited to, elevating privileges, configuring access to specific monitoring functions (e.g., by connecting to portions of the compute node configured to perform monitoring functions), obtaining access to information regarding software used by the compute node, inserting the security agent into the startup process of any applications executed by the compute node (i.e., such that the security agent can inspect each new application and decide whether or not it should be prevented from running), and the like. In a further embodiment, S410 may further include assigning application entity identifiers to each application entity hosted on the compute node.

In an embodiment, the security agent is configured for side-band monitoring which does not require that the security agent be deployed in-line of traffic and intercept any traffic into or out of the compute node. To this end, the reconfiguration may only include accessing monitoring functions which do not require interception of traffic or other in-line activities.

At S420, the security agent collects traffic data related to application entities hosted by the compute node using the monitoring functions accessed in S410.

At S430, node-local connectivity data for the compute node is generated. The node-local connectivity data indicates at least connections with application entities hosted by the compute node.

At S440, the node-local connectivity data is sent to a central monitoring system (e.g., the central monitoring system 130, FIG. 1).

Figure 5:
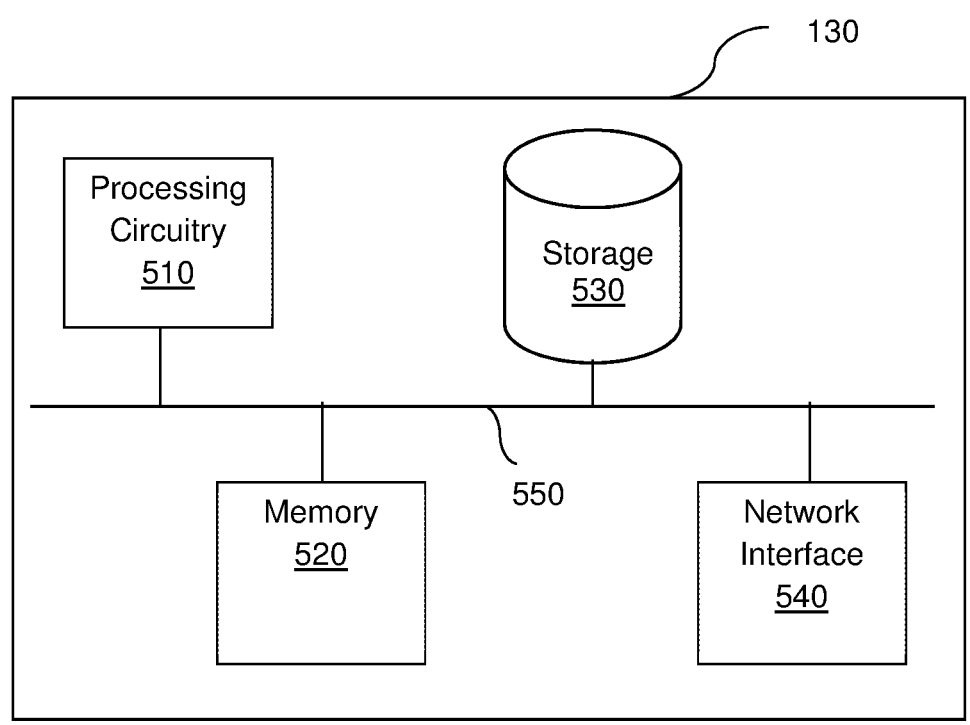
FIG. 5 is a schematic diagram of a central monitoring system according to an embodiment.

FIG. 5 is an example schematic diagram of a central monitoring system 130 according to an embodiment. The central monitoring system 130 includes a processing circuitry 510 coupled to a memory 520, a storage 530, and a network interface 540. In an embodiment, the components of the central monitoring system 130 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 520 may be volatile (e.g., RAM, etc.), non-volatile (e.g., ROM, flash memory, etc.), or a combination thereof. In one configuration, computer readable instructions to implement one or more embodiments disclosed herein may be stored in the storage 530.

In another embodiment, the memory 520 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, CD-ROM, Digital Versatile Disks (DVDs), or any other medium which can be used to store the desired information.

The network interface 540 allows the central monitoring system 130 to communicate with the agents 117-1 through 117-n for the purpose of, for example, receiving node-local connectivity data. The network interface 540 may further allow the central monitoring system 130 to send topological graphs for display, for example to the end user device 140.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method comprising:
    obtaining connectivity data collected by a plurality of agents installed on respective ones of a plurality of compute nodes of a cloud environment in which a plurality of application entities is hosted, wherein those of the connectivity data corresponding to each compute node of the plurality of compute nodes indicate communications between one or more of the plurality of application entities hosted on the compute node with others of the plurality of application entities based on identifiers assigned to the plurality of application entities;
    based on correlating the connectivity data obtained across the plurality of compute nodes, determining a plurality of connections among the plurality of application entities;
    generating, based on the plurality of connections, a graph representation of the plurality of application entities, wherein the graph representation indicates the plurality of connections among the plurality of application entities; and
    aggregating graph representations of related applications based on the related applications having at least a first application entity of the plurality of application entities in common, wherein aggregating the graph representations creates a multiple tier graph that comprises a first tier and a second tier, wherein the first tier represents connections among the related applications that have the first application entity in common and the second tier represents connections of the first application entity with other application entities.

2. The method of claim 1, wherein each of the plurality of agents is deployed out-of-line of traffic into and out of the respective one of the plurality of compute nodes on which it is installed.

3. The method of claim 1, wherein each of the plurality of application entities is a microservice.

4. The method of claim 1, wherein the identifiers were assigned to the plurality of application entities by corresponding ones of the plurality of agents, and wherein each of the identifiers is persistent.

5. The method of claim 4, wherein correlating the connectivity data comprises correlating the connectivity data based on the identifiers of the plurality of application entities indicated in the connectivity data.

6. The method of claim 4, wherein each of the identifiers is a pod identifier or an image identifier.

7. The method of claim 1, wherein the connectivity data collected by each of the plurality of agents executing on a corresponding one of the plurality of compute nodes comprise at least one of connections and groupings of those of the plurality of application entities hosted on the compute node and corresponding identifiers of those of the plurality of application entities.

8. A non-transitory computer readable medium having program code stored thereon, the program code comprising instructions to:
    determine, based on correlation of connectivity data collected by a plurality of agents, a plurality of connections among a plurality of application entities that are hosted on a plurality of compute nodes in a cloud environment, wherein each agent of the plurality of agents is installed on a respective one of the plurality of compute nodes, wherein the connectivity data indicate communications among the plurality of application entities hosted by the plurality of compute nodes based on identifiers assigned to the plurality of application entities;
    generate a graph representation of the plurality of application entities based on the plurality of connections, wherein the graph representation indicates the plurality of connections among the plurality of application entities; and
    aggregate graph representations of related applications based on the related applications having at least a first application entity of the plurality of application entities in common, wherein aggregation of the graph representations creates a multiple tier graph that comprises a first tier representing connections among the related applications that have the first application entity in common and a second tier representing connections of the first application entity with other application entities.

9. The non-transitory computer readable medium of claim 8, wherein each of the identifiers was assigned to a corresponding one of the plurality of application entities by the corresponding one of the plurality of agents, and wherein each of the identifiers is a persistent identifier.

10. The non-transitory computer readable medium of claim 9, wherein each of the identifiers is a pod identifier or an image identifier.

11. The non-transitory computer readable medium of claim 8, wherein the instructions for the correlation of the connectivity data comprise instructions to correlate the connectivity data based on the identifiers of the plurality of application entities that are indicated in the connectivity data.

12. The non-transitory computer readable medium of claim 8, wherein each of the plurality of application entities is a microservice.

13. The non-transitory computer readable medium of claim 8, wherein each of the plurality of agents is deployed out-of-line of traffic into and out of the respective one of the plurality of compute nodes on which it is installed.

14. A system comprising:
a processing circuitry; and
a memory comprising instructions that, when executed by the processing circuitry, cause the system to:
obtain connectivity data collected by a plurality of agents installed on respective ones of a plurality of compute nodes of a cloud environment in which a plurality of application entities is hosted, wherein those of the connectivity data corresponding to each compute node of the plurality of compute nodes indicate communications between one or more of the plurality of application entities hosted on the compute node with others of the plurality of application entities based on identifiers assigned to the plurality of application entities;
based on correlation of the connectivity data obtained across the plurality of compute nodes, determine a plurality of connections among the plurality of application entities;
generate, based on the plurality of connections, a graph representation of the plurality of application entities, wherein the graph representation indicates the plurality of connections among the plurality of application entities; and
aggregate graph representations of related applications based on the related applications having at least a first application entity of the plurality of application entities in common to create a multiple tier graph that comprises a first tier and a second tier, wherein the first tier represents connections among the related applications that have the first application entity in common and the second tier represents connections of the first application entity with other application entities.

15. The system of claim 14, wherein each of the plurality of agents is deployed out-of-line of traffic into and out of the respective one of the plurality of compute nodes on which it is installed.

16. The system of claim 14, wherein each of the plurality of application entities is a microservice.

17. The system of claim 14, wherein the identifiers were assigned to the plurality of application entities by corresponding ones of the plurality of agents, and wherein each of the identifiers is persistent.

18. The system of claim 17, wherein the instructions that cause the system to correlate the connectivity data when executed by the processing circuitry comprise instructions that cause the system to, when executed by the processing circuitry, correlate the connectivity data based on the identifiers of the plurality of application entities indicated in the connectivity data.

19. The system of claim 17, wherein each of the identifiers is a pod identifier or an image identifier.

20. The system of claim 14, wherein the connectivity data collected by each of the plurality of agents executing on a corresponding one of the plurality of compute nodes comprise at least one of connections and groupings of those of the plurality of application entities hosted on the compute node and corresponding identifiers of those of the plurality of application entities.

* * * * *